United States Patent
Abe et al.

(10) Patent No.: US 7,177,726 B2
(45) Date of Patent: Feb. 13, 2007

(54) OPERATION-ASSISTING SYSTEM AND OPERATION-ASSISTING COMPUTER PROGRAM

(75) Inventors: Keiko Abe, Mito (JP); Yasushi Harada, Hitachi (JP); Masahiro Watanabe, Hitachi (JP); Shouji Matsuzaki, Hitachi (JP); Shinichirou Nakanami, Hitachi (JP); Noriyuki Murakoshi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/330,263

(22) Filed: Jan. 12, 2006

(65) Prior Publication Data

US 2006/0116795 A1 Jun. 1, 2006

Related U.S. Application Data

(63) Continuation of application No. 10/640,394, filed on Aug. 14, 2003.

(30) Foreign Application Priority Data

Nov. 18, 2002 (JP) ............................. 2002-333022

(51) Int. Cl.
  *G05D 11/00* (2006.01)
(52) U.S. Cl. ...................................... 700/286; 700/291
(58) Field of Classification Search ................ 700/286, 700/291, 295, 97; 705/10, 87, 412
  See application file for complete search history.

(56) References Cited

U.S. PATENT DOCUMENTS

| 2002/0035496 A1 | 3/2002 | Fukushima et al. | |
| 2002/0178047 A1 | 11/2002 | Or et al. | |
| 2003/0083788 A1 | 5/2003 | Harada et al. | |
| 2003/0101062 A1 | 5/2003 | Taber | |
| 2003/0110116 A1 | 6/2003 | Inubushi | |
| 2003/0126060 A1* | 7/2003 | Lof et al. | 705/36 |
| 2003/0200010 A1* | 10/2003 | Chiang et al. | 700/286 |
| 2005/0004824 A1* | 1/2005 | Sheffler et al. | 705/7 |
| 2005/0203670 A1* | 9/2005 | Kusaka et al. | 700/286 |

FOREIGN PATENT DOCUMENTS

| JP | 04-359360 | 12/1992 |
| JP | 05-164377 | 6/1993 |
| JP | 9-285010 | 10/1997 |
| JP | 2000-270473 | 9/2000 |
| JP | 2000-274308 | 10/2000 |
| JP | 2001-282889 | 10/2001 |

* cited by examiner

*Primary Examiner*—Zoila Cabrera
(74) *Attorney, Agent, or Firm*—Dickstein Shapiro LLP

(57) ABSTRACT

An operation assisting system enhances the operator's willingness to participate in energy-saving efforts. The operation assisting system stores information about the actual operation of operated equipment carried out by the operator, evaluates the stored operation information, and displays the results of evaluation. The evaluation results relate to the cost concerning the operated equipment, the cost of supplying energy to the operation target facility, the cost concerning the operated equipment, the amount of emission of carbon dioxide, nitride oxide, and global warming substances, the amount of primary energy consumption, the crude oil-converted amount of energy consumption, the amount of excess or shortage of supply of energy, or electric power quality.

1 Claim, 12 Drawing Sheets

OPERATION-ASSISTING SYSTEM AND OPERATION-ASSISTING COMPUTER PROGRAM

This application is a continuation of application Ser. No. 10/640,394, filed Aug. 14, 2003, the entire disclosure of which is incorporated herein by reference.

BACKGROUND OF THE INVENTION

1. Field of the Invention

The present invention relates to a technology for assisting or guiding a cogenerator operation method, so that necessary quantities of electric power or steam for use in factories or other buildings can be optimally generated in view of particular purposes, such as for the minimization of cost or carbon dioxide emissions. The invention also relates to an energy management system for assisting energy cutting measures in factories or other buildings, such as by assisting or guiding certain air conditioning settings. Beyond energy applications, the invention can also be used in assisting the operator of a system in which a final plan is decided upon based on appropriate results provided by computer and those provided by human (operator) senses. Furthermore, the invention can be applied to systems in which the appropriateness of results (processes) of human decisions is evaluated for the purpose of improving humanity's decision-making abilities.

2. Background Art

Due to problems such as global warming, finding methods of saving energy is now a pressing concern for humanity. In the $3^{rd}$ Session of the Conference of the Parties to the United Nations Framework Convention on Climate Change (in Kyoto), concrete targets were set for reducing amounts of carbon dioxide emissions. In Japan, an Energy Conservation Law has been made, and large factories now employ certified energy conservation specialists. As a means of conserving energy, cogeneration technology is gaining attention. Cogeneration generates electric power/steam (heat) from fuels and utilizes both. A cogeneration system is comprised of an intricate combination (flow of energy) of elements such as a gas turbine, steam turbine, boiler, gas engine, micro-gas turbine, and heat regenerator. The electric or steam (thermal) power demand at operation target factories or buildings varies continuously. Thus, it is difficult for operators to calculate or plan how cogenerator operating equipment, including gas turbines, steam turbines, boilers, gas engines and micro-gas turbines, should be operated in order to meet the changing energy demand every day or for each instance in an energy- and cost-efficient manner. Accordingly, there is a need for a cogenerator operation assisting system that can predict electric power/steam demand at factories or other buildings and determine the most energy- or cost-efficient method of operating gas or steam turbines depending on the predicted electric power/steam demand, thus providing operation guidance.

In the prior art, a system has been proposed that predicts the electric power/steam demand at an operation target facility for a given day on an hourly basis based on weather conditions and schedule. The system then determines a cost-minimizing method of operating the cogenerator for supplying the necessary electric power/steam, thus providing guidance to the operator.

JP Patent Publication (Kokai) No. 2000-274308 A discloses a method of determining a cost-minimizing power supply (operation) method based on a combination of electricity purchase and cogeneration. JP Patent Publication (Kokai) No. 9-285010 A (1997) describes a method of predicting demand based on demand prediction results provided by a plurality of demand prediction means.

Prediction of electric power/steam demand on a continuous basis is required, because electric power cannot be stored. Machine-based predictions, however, are often inaccurate. Various counter-measures have been proposed, such as disclosed in the above-mentioned publication JP Kokai No. 9-285010, and yet the results are not accurate enough. As a result, operators, unable to put faith in demand predictions on the basis of which they are supposed to plan an optimum operation method, begin to rely on educated guesses and disregard the use of machines even for the calculation or planning of a cost- and energy-minimizing method of supplying energy, which they are best at. This has not necessarily resulted in energy- and cost-saving operations and, moreover, often discouraged the operators' enthusiasm for the cause of energy conservation, for they have no idea how much they are contributing to energy-saving efforts.

SUMMARY OF THE INVENTION

It is therefore an object of the invention to provide an operation assisting system that can flexibly cope with demand fluctuations by taking advantage of both operator know-how and the machine-based demand prediction/cost-minimizing operation calculations (planning).

It is another object of the invention to provide an operation assisting system that indicates the degree of contribution of the operator of a cogenerator to energy-saving efforts in concrete terms, thus increasing his or her willingness to participate in such efforts.

Yet another object of the invention is to provide an energy management system that takes advantage of both operator know-how and machine-based energy-saving advice and optimizing calculations, thus increasing the operator's willingness to participate in energy-saving efforts.

To achieve these objects of the invention, the operator determines a method of operating a cogenerator, for example, by taking advantage of both his or her own operation know-how and a machine-based optimum operation plan.

(a) Machine-predicted demand+machine-based optimum operation plan (b) Operator-predicted demand+machine-based optimum operation plan (c) Operator-predicted demand+operator-based operation plan Based on the information (a) to (c), the operator decides on an operation method. The operator's contribution, such as how the actual electric power/steam demand has been successfully met at lower cost on account of the operator's decision, or how appropriate the operator's decision was, is evaluated on the basis of any difference between the machine-predicted demand and the actual demand, and by simulating the machine-based operation. This way, the operator's willingness to participate in energy-saving efforts can be enhanced.

(The sign "+" as in "(a) Machine-predicted demand+machine-based optimum operation plan" indicates, for example, that the amounts of electric power/steam are predicted by a machine, and then an optimum cogenerator operation plan is formulated by the machine to meet those amounts. In the following descriptions, the sign "+" will be used with the same meaning.)

DESCRIPTION OF PREFERRED EMBODIMENTS

Figure 1:
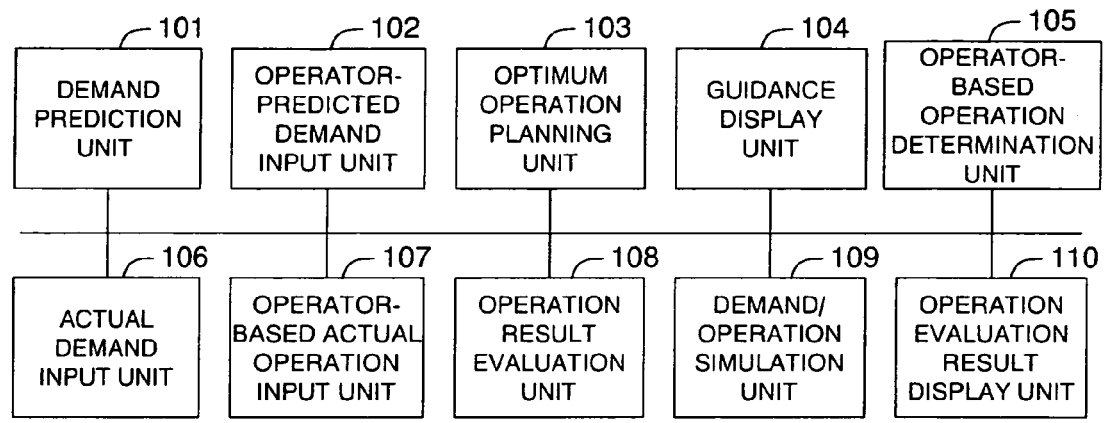
FIG. 1 shows a functional block diagram of an embodiment of the invention.

Embodiments of the invention will be hereafter described by referring to the drawings. First, an example will be described in which the invention is used to assist an optimum operation of a cogenerator for a factory or a building.

FIG. 1 shows a functional block diagram of the invention. A demand predicting unit 101 carries out a machine-based prediction of electric power/steam demand at the factory or building. An operator-predicted demand input unit 102 receives results of the operator's prediction concerning the electric power/steam demand at the operation target facility, namely the factory or building. An optimum operation planning unit 103 carries out machine-based planning of an optimum (meaning "cost-minimizing" or "carbon-dioxide emissions minimizing," for example) method of operating the cogenerator (including a gas turbine, steam turbine, boiler, gas engine, micro-gas turbine and heat generator) in accordance with the electric power/steam demand calculated in the demand predicting unit 101 and the operator-predicted demand input unit 102. A guidance display unit 104 displays an optimum operation plan, for example, prepared in the optimum operation planning unit 103. An operator-based operation determination unit 105 receives the cogenerator operation method that the operator finally has decided upon in view of the information displayed on the guidance display unit 104, such as the machine-based demand prediction and optimum operation plan, the operator-predicted demand and machine-based optimum operation plan, and the operator-predicted demand and optimum operation plan. An actual-demand input unit 106 receives entries concerning the actual amounts of electric power/steam demand at the factory or building. An operator-based actual operation input unit 107 receives entries concerning the manner (as an initial plan may be modified halfway through) and results of the operator's actual operation of the cogenerator. An operation result evaluation unit 108 evaluates the operator's operation in terms of how the necessary electric power/steam demand has been met with minimum cost and carbon dioxide emissions by the operator's operation (including whether or not he or she appropriately handled demand fluctuations). A demand/operation simulation unit 109 confirms the appropriateness of a machine-proposed operation method, for example, by simulation. Specifically, when the operator's operation is evaluated by the operation result evaluation unit 108, the demand/operation simulation unit 109 simulates the results of following a machine-predicted demand and machine-based operation plan. The simulated results may include possible scenarios that the actual demand fluctuations could not be met and supply was lacking, or that supply exceeded the actual demand and cost and carbon dioxide emissions increased, for example. An operation result display unit 110 displays the results of a conducted evaluation in the operation result evaluation unit 108.

The guidance display unit 104 and the operation evaluation result display unit 110 may be a common display (or output) unit.

For the entry of operator operation information, the operator-based operation determination unit 105 may be omitted and the operator-based actual operation input unit 107 may be provided alone.

In addition to the functions mentioned above, the demand/operation simulation unit 109 may be used for simulating what would happen if circumstances were to change in the operator's demand prediction or the operation plan the operator is about to decide upon (For example: What would happen if steam supply runs low and the process has to be stopped?) before the operator decides on an operation method via the operator-based operation determination unit 105. By doing so, a plan can be formulated that would not result in production losses even if circumstances deviate from predictions.

Figure 2:
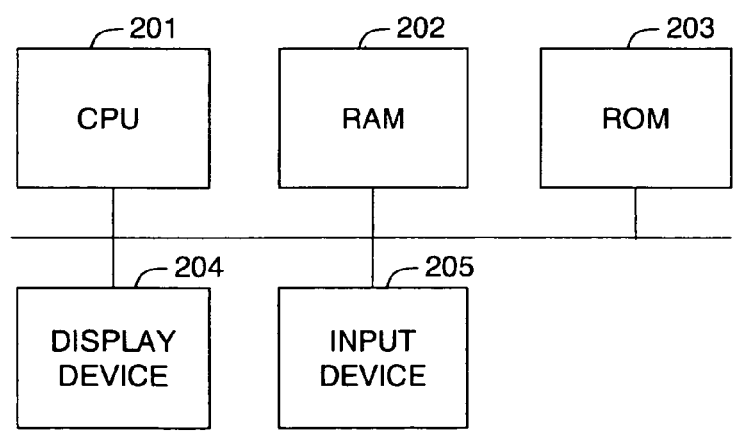
FIG. 2 shows a diagram of an embodiment of the invention.

FIG. 2 shows the constituent elements of the invention, which include a CPU 201, a RAM 202, a ROM 203, a display (output) device 204, and an input device 205. The CPU 201 reads programs stored in the RAM 202, predicts electric power/steam demand, determines an optimum cogenerator operation plan, and outputs the results on the display (output) device 204. An operator enters via the input device 205 a final cogenerator operation plan, an actual electric power/steam demand, and the cogenerator operation method that has actually been carried out. The operator inputs are evaluated by the CPU 201 based on a program the CPU reads from the RAM 202. The results are outputted to the display (output) device 204. Details of these processes will be described later.

Figure 3:
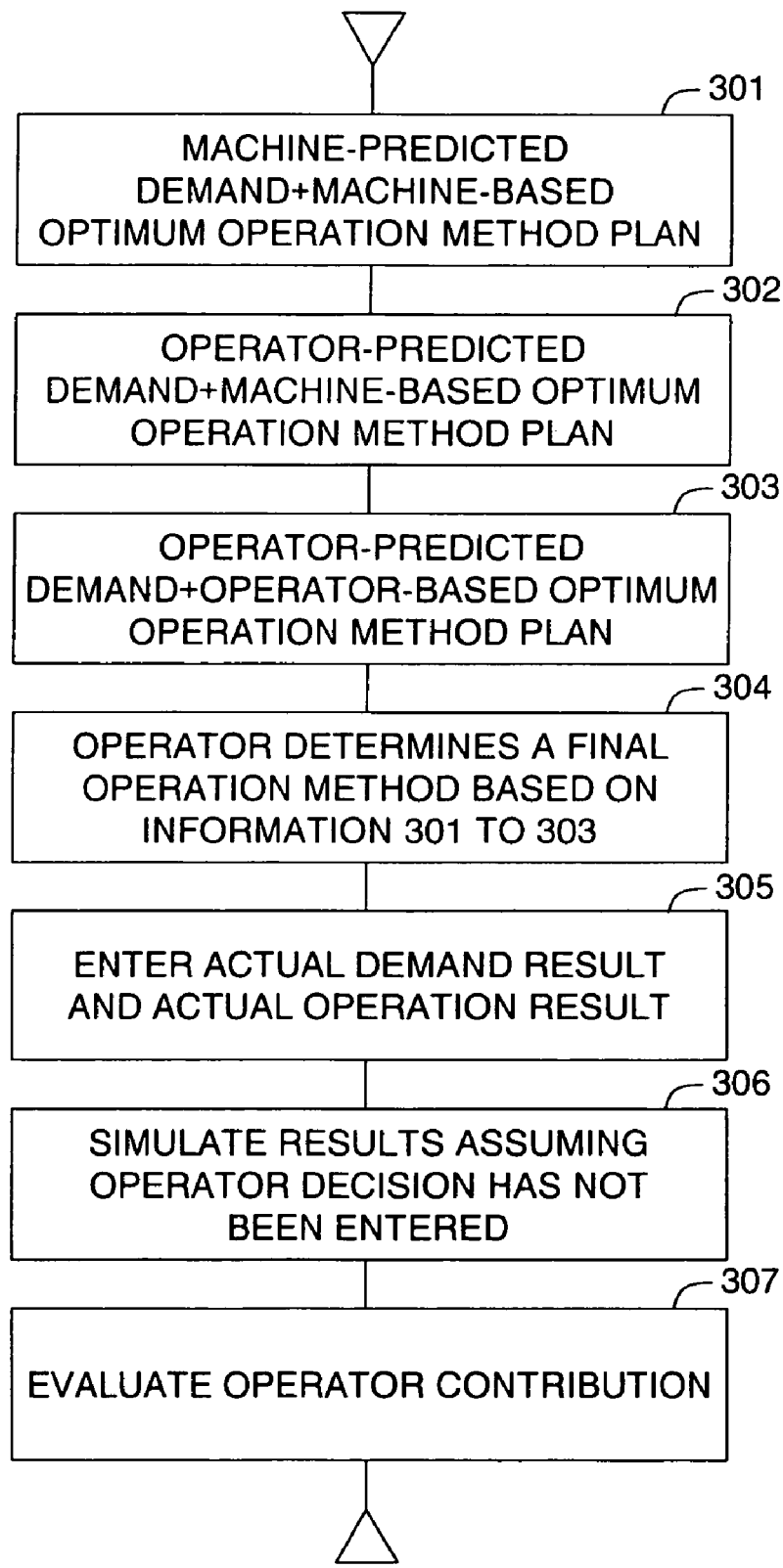
FIG. 3 shows a processing flow of an embodiment of the invention.

FIG. 3 shows an example of the processing flow of the invention. Initially, a machine predicts the electric power/steam demand and, based on the predicted demand, plans an optimum cogenerator operation method (301). Then, the operator predicts the electric power/steam demand based on his or her experience, and the machine, based on the operator-predicted demand, plans an optimum cogenerator operation method (302). The operator then predicts the electric power/steam demand based on experience, and further plans an optimum cogenerator operation method (303). Based on the information obtained in 301 to 303 (machine-predicted demand+machine-based optimum operation plan, operator-predicted demand+machine-based optimum operation plan, and operator-predicted demand+ operator-based optimum operation plan), the operator decides on a final operation method (304). The final operation method may be selected by the operator from 301 to 303, or it may be created by the operator based on each item of information. The cogenerator is then operated according to the operator's decision. The actual electric power/steam demand and the result of operation of the cogenerator according to the operator's decision are fed to the system (305). The system then carries out simulations to determine whether or not there would have been any supply shortage or oversupply with respect to the actual demand, or if the operation cost or carbon dioxide emissions would have been appropriate, had there not been operator judgments (306). The actual-demand and actual-operation results 305 and the simulation results 306 are compared to evaluate the degree of operator contribution, and the comparison results are displayed (outputted) for the operator (307). Thus, the operator can see the degree of his or her level of contribution to the energy-saving efforts and be evaluated accordingly. This enhances the willingness of operators to participate in the efforts and come up with better operation plans.

In the machine-based demand prediction and machine-based cogenerator operation method plan, an operation plan is formulated by machine based on information concerning the date such as year, month and day, weather, temperature, events, number of people involved, employee attendance and holidays. Specifically, based on the entry of such information, the machine predicts the steam or electric power demand for the day and formulates an optimum (cost- and carbon dioxide emission-minimizing, for example) cogenerator operation method commensurate with the demand by a mathematical programming method, for example. Details of the planning method are known in the prior art (such as the above-mentioned JP Kokai No. 2000-274308).

The term "optimum" means not only minimization of cost (including the cost of supplying energy and the cost of the operated equipment such as the cogenerator) and minimization of carbon dioxide emissions, but also minimization of nitrogen oxides, global warming substances, primary energy consumption, crude oil-converted energy consumption, and other indexes.

Specifically, the cost of energy supply including the cost of operated equipment (such as a cogenerator) includes the cost of introducing the cogenerator and the cost of supplying energy (such as fuel cost and operator personnel cost). For example, if the cogenerator costs 10 million yen and is assumed to be used for five years, the operated equipment cost would be 10 million/5=2 million yen per year.

Preferably, an optimum operation plan may be formulated by taking the purchase of electric energy into account, in addition to the supply of energy by cogeneration. (In this case, the plan may include the purchase of electric energy at night if unit purchase price at night is lower, and the operation of the cogenerator in daytime.)

In order for the operator to decide on the final cogenerator operation method in 304, he or she may be presented with information other than that provided in 301 to 303 (machine-predicted demand+machine-based optimum operation plan, operator-predicted demand+machine-based optimum operation plan, and operator-predicted demand+operator-based optimum operation plan), such as machine-predicted demand+operator-based optimum operation plan.

When the operator decides on a final cogenerator operation method in 304, the operation method may be confirmed by simulation, thus facilitating the operator's decision-making process.

The operator may make more than one decision in 304 regarding the final cogenerator operation method. Namely, the operator may modify or change the cogenerator operation plan whenever required in light of the actual situation of the steam or electric demand. By so doing, the operator can adapt the operation plan to deviations between the initial prediction result and the actual demand or to changes in production plans. Thus, the final operation results including such flexible changes in the operation plan are evaluated in 305 to 307 as those resulting from an operation by the operator.

The input of actual demand and actual operation results in 305 may be automatically carried out by a sensor or the like. The operation control of the cogenerator may also be carried out automatically according to the operation plan determined by the operator. These examples will be described later with reference to other embodiments.

The evaluation of the degree of contribution of the operator in 307 may be based on whether or not there was energy supply shortage or excess with respect to the actual steam or electric power demand, whether the energy supply cost was appropriate, or whether the carbon dioxide emissions were within appropriate levels (i.e., whether the operator's demand prediction and operation plan were better than those that depended only on the machine).

While in this example the electric power/steam supply is optimized, preferably other types of energy, such as thermal energy, may be optimized. In this case, the operated equipment plan may incorporate a thermal storage means such as a thermal ice storage system, for example.

Now referring to FIGS. 4 to 6, an example of the display screen (output) of the invention will be described.

Figure 4:
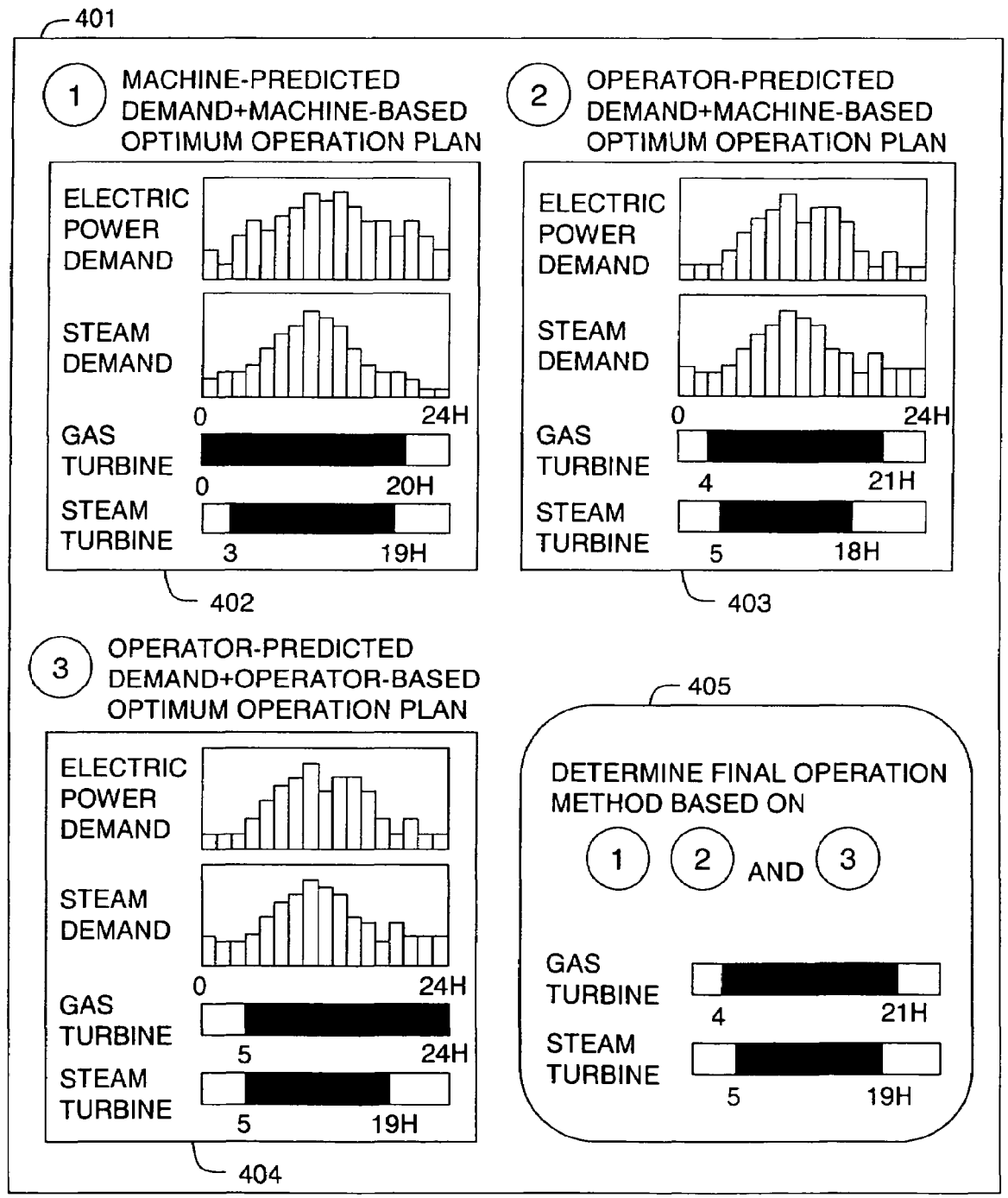
FIG. 4 shows an example of a screen for the determination of an operation method by the operator according to an embodiment of the invention.

FIG. 4 shows an example of the screen 401 on which the operator decides on a final operation method in 304. Numeral 402 designates a machine-predicted demand+machine-based cogenerator operation method plan (result of 301). Numeral 403 designates a machine-predicted demand+operator-based cogenerator operation method plan (result of 302). Numeral 404 designates an operator-predicted demand+operator-based cogenerator operation method plan (result of 303). Based on these items of information, the operator specifies a final operation method in 405. The operator examines the information in 402 to 404 before deciding on a final operation method in 405.

Preferably, as the day's actual electric power/steam demand becomes partly clear, part of the predicted demand may be replaced with the actual demand and the subsequent demand may be predicted based on that actual demand. An optimal operation plan is then displayed (402 to 404), and the operator's final operation plan 405 may be changed as required.

(Note: In FIG. 4, the periods in which the gas turbine and the steam turbine are in operation are indicated by blackened sections. For example, in 405, the gas turbine is activated at 4 and terminated at 21 o'clock.) While in the illustrated example only the times of activation and termination of the gas and steam turbines are indicated, optimum outputs of each piece of operated equipment may be indicated.

Figure 5:
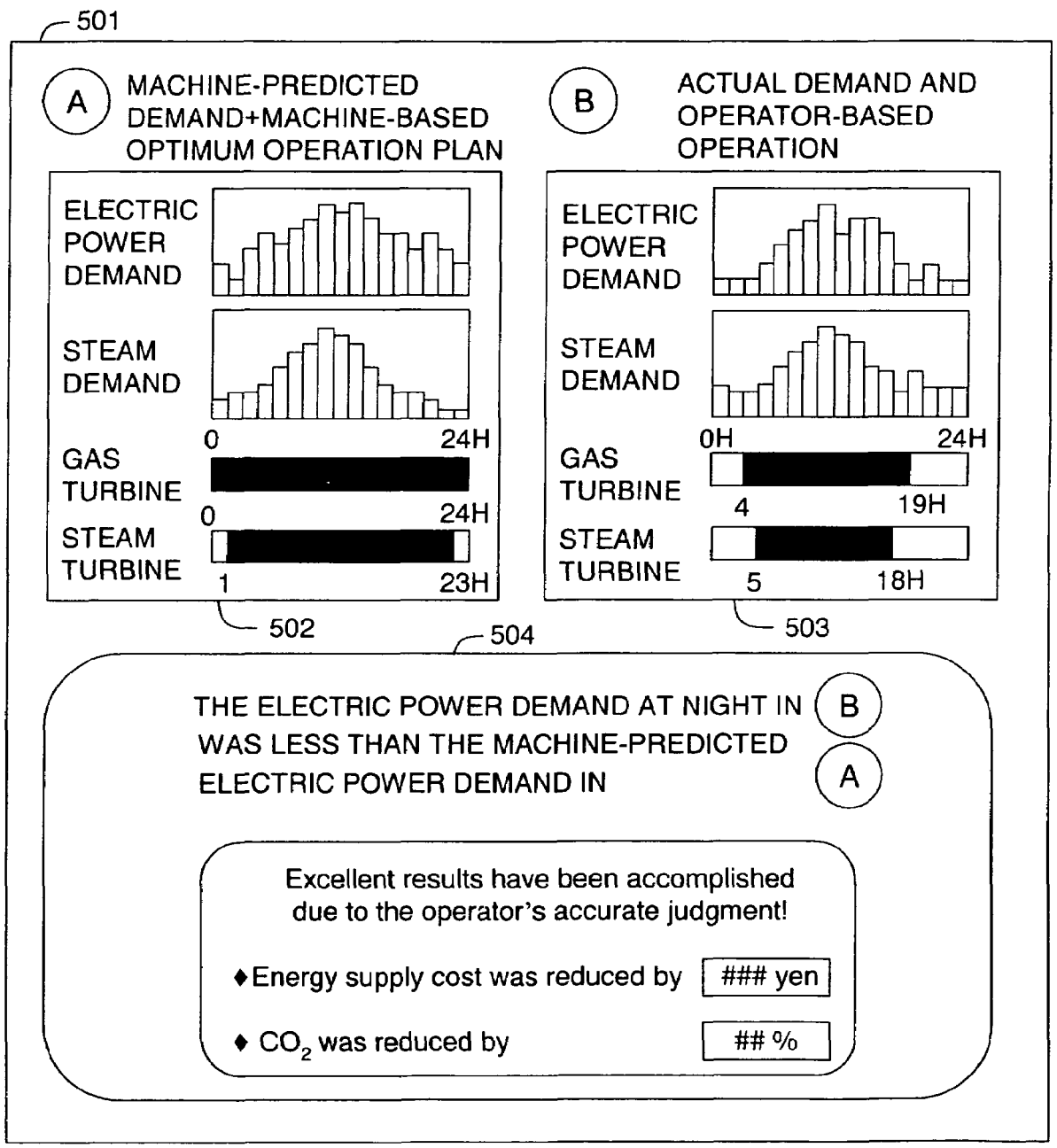
FIG. 5 shows an example of a screen for evaluating the operator contribution according to an embodiment of the invention.

FIG. 5 shows an example of the screen 501 displaying (outputting) the results of evaluation of operator contribution in 307. In the illustrated example, (A) the electric power/steam demand predictions and the optimum operation plan in 301 ("Machine-predicted demand+machine-based optimum operation plan") (502) are compared with (B) the actual demand and the actual operation method carried out by the operator (503). In the illustrated example, the actual demand (B) was less in terms of power demand at night than the machine-predicted electric power demand (A). Thus, in this example, it was more advantageous to only purchase electricity and not operate the gas and steam turbines at night from the viewpoint of cost and carbon dioxide emissions. In this example, an appropriate cogeneration operation was carried out due to the operator's correct judgment. Thus, a message is displayed in 504 that evaluates (praises) the operator's contribution in concrete terms, saying, "Excellent results have been accomplished due to the operator's accurate judgment! Energy supply cost was reduced by ### yen; $CO_2$ was reduced by ##%."

In the example of FIG. 5, (A) the electric power/steam demand predictions and the optimum operation plan in "Machine-predicted demand+machine-based optimum operation plan" (502) and (B) the actual demand and the operation method actually carried out by the operator (503) are compared and displayed. However, the display unit may also display simulation results (306) under the day's conditions (including the temperature and the intake temperature of the gas turbine), indicating how much loss or excess with respect to the actual demand would have resulted or how much loss would have resulted in terms of cost or carbon dioxide emissions, had it not been for any operator-initiated changes in the machine-based operation plan.

In the example of FIG. 5, with regard to the cost and carbon dioxide emissions, only the differences between (A) "Machine-predicted demand+machine-based optimum operation plan" and (B) the actual demand and the operation method actually carried out by the operator are displayed. Preferably, however, concrete values of the cost and the carbon dioxide emissions may be displayed.

Figure 6:
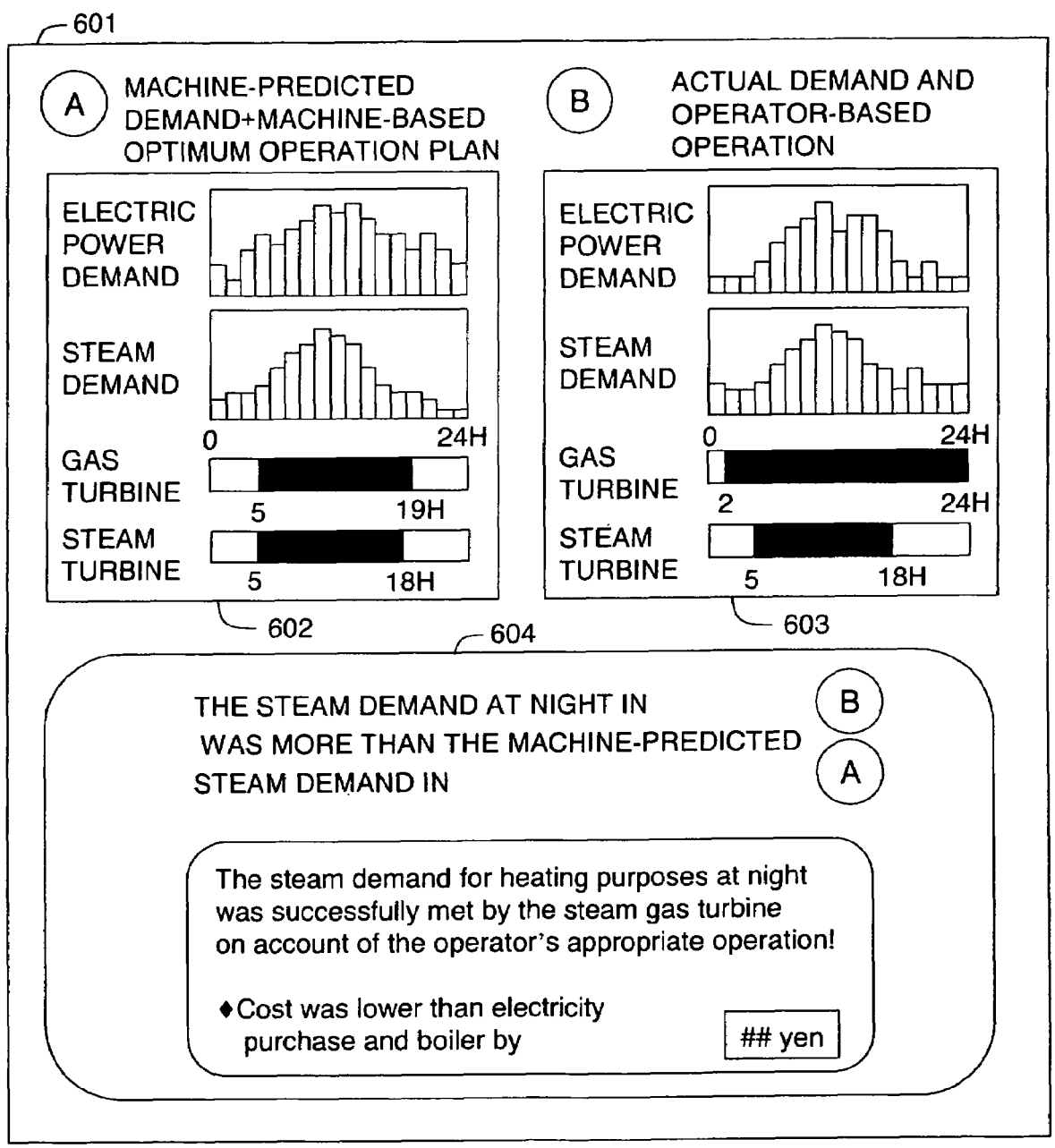
FIG. 6 shows an example of a screen for evaluating the operator contribution according to an embodiment of the invention.

FIG. 6 shows an example of the screen 601 for displaying (outputting) the result of evaluation of the operator contribution in 307. In this example, (B) actual demand (603) was more than (A) machine-predicted electric power demand (602) in terms of steam demand at night. The machine-based operation plan (A) considered purchasing electric power at night when electric power cost is cheaper. However, in reality, there was greater demand for steam at night for heating purposes, and it was more cost-effective to generate electric power/steam by operating the gas turbine. In this example, the gas turbine was operated due to the accurate judgment of the operator so that the steam demand at night was met. Thus, cost was reduced as compared with the supply of electric power/steam by electricity purchase and boiler, and, therefore, a message is displayed in 604 that evaluates (praises) the operator's contribution.

In the examples of FIGS. 5 and 6, the operator's contribution is praised because of the successful reduction of cost or carbon dioxide emissions as compared with the "Machine-predicted demand+machine-based optimum operation plan." Preferably, praise may be given in other cases, such as when appropriate amounts were supplied to meet electric or steam demands (even if the results were less advantageous than the machine-based plan in terms of cost or carbon dioxide emissions). Thus, by positively evaluating the overall operation even if it should be negatively evaluated in some respects, the overall operation (energy supply) can proceed smoothly. Further, by thus positively evaluating the operator, his or her willingness to do more for operation and energy-saving efforts could be enhanced.

In the examples of FIGS. 5 and 6 the operator's operation is positively evaluated. Preferably, in cases where the operator's operation was inappropriate, the operator may be presented with information about the ways in which his or her operation was inappropriate and how he or she could have accomplished an appropriate operation. Specifically, when the actual demand has been established (305 and later), the demand can be finalized and a machine-based optimum operation plan may be formulated to indicate what operation method would have been optimum, thus providing a cost-minimizing or energy-minimizing operation method. The machine may thus indicate an optimum operation method to the operator with respect to the established demand, and the operator's operation technique can be enhanced. By thus combining the advantages of the operator and the machine, the present system can help determine the final operation method. Thus, it becomes possible to operate with less cost and/or less energy in the future.

An operation method that should require less cost and/or energy in machine calculations may in reality render frequent activation and termination of gas or steam turbines impossible due to the characteristics of these devices. The method may also be inexecutable due to the operator's work conditions. In such cases, detailed conditions can be incorporated into the machine-based operation plan model, or, as it is the operator who makes the final decision on the operation method in view of the machine-based results, he or she can adjust the operation method when making a decision about it. Thus, in accordance with the invention, in which the operator makes a final decision on the operation method in view of the machine-based optimum operation plan and the operator-based optimum operation plan (including know-how), these problems may be flexibly dealt with.

Hereafter, another embodiment of the invention will be described. In this embodiment, the system according to the initial embodiment (for assisting the optimum operation of a cogenerator, for example) is connected to a remote device such as an actual cogenerator, so that the device can be automatically operated according to an operation plan determined by the operator. The system can also automatically obtain (monitor) information about the changes in the actual electric power/steam demand or the operation state of the cogenerator. The system is also capable of learning electric and steam demands, as well as the operator's operation method.

Figure 7:
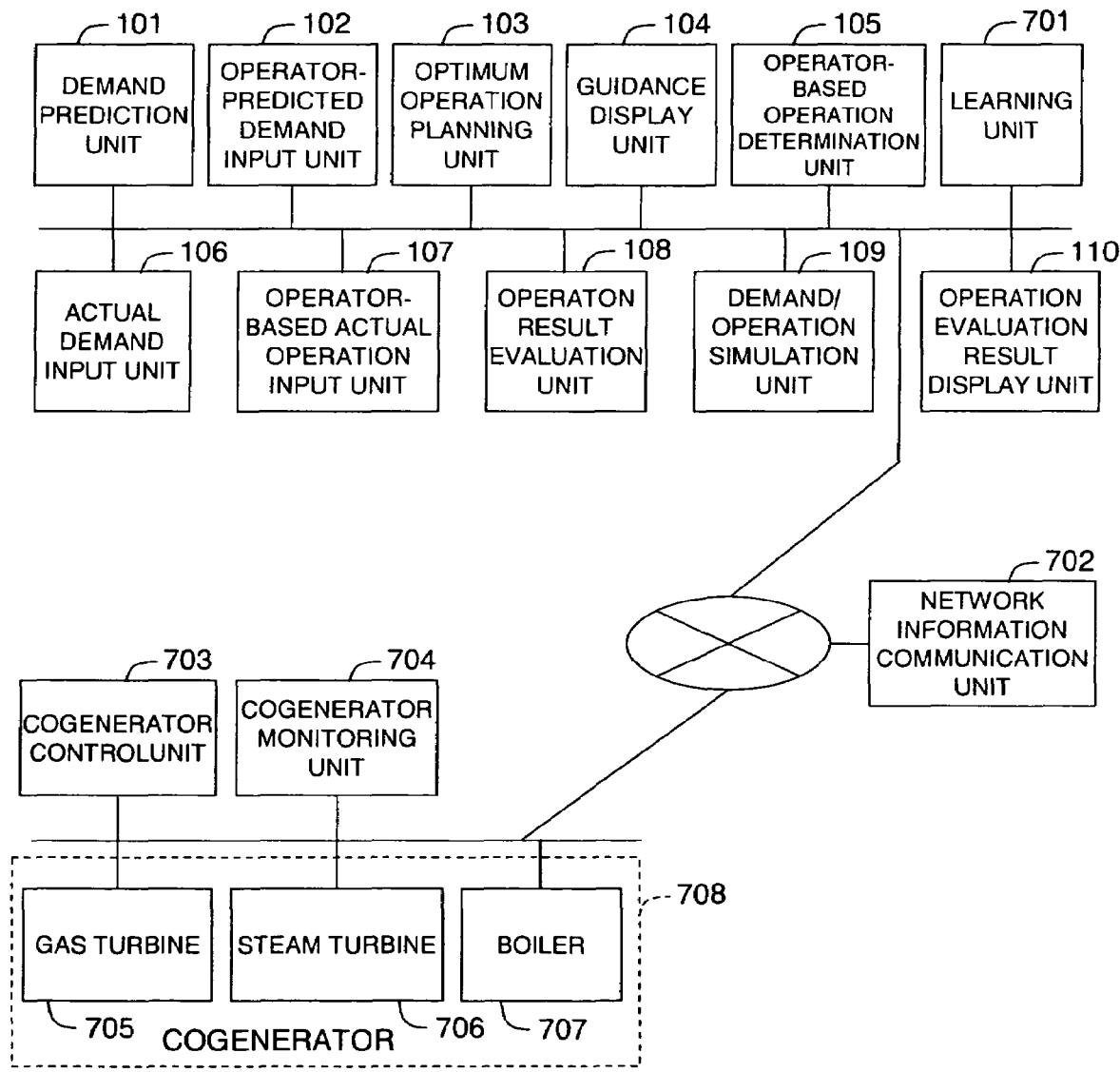
FIG. 7 shows a functional block diagram of an embodiment of the invention.

FIG. 7 shows a functional block diagram of the invention. The invention includes, in addition to the functions 101 to 110 shown in FIG. 1, a learning unit 701 for learning about the electric power/steam demand or the operator's operation method. It also includes a network information communication unit 702 for communicating information via a network to monitor and control a cogenerator remotely. It further includes a cogenerator control unit 703, a cogenerator monitoring unit 704, and a cogenerator 708 including a gas turbine 705, a steam turbine 706, and a boiler 707.

Figure 8:
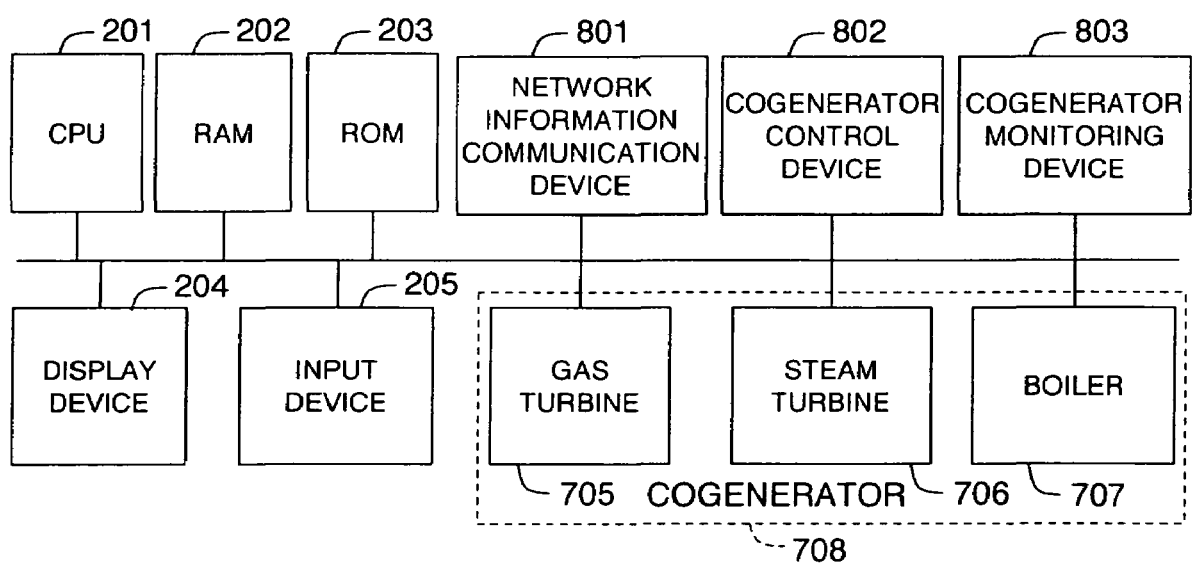
FIG. 8 shows a diagram of an embodiment of the invention.

Referring to FIG. 8, the constituent elements of the invention will be described. In addition to the elements shown in FIG. 2, the invention includes a network information communication device 801, a cogenerator control device 802, a cogenerator monitoring device 803, and a cogenerator 708 including a gas turbine 705, a steam turbine 706, and a boiler 707. The operation flow will be described by referring to FIG. 9.

Figure 9:
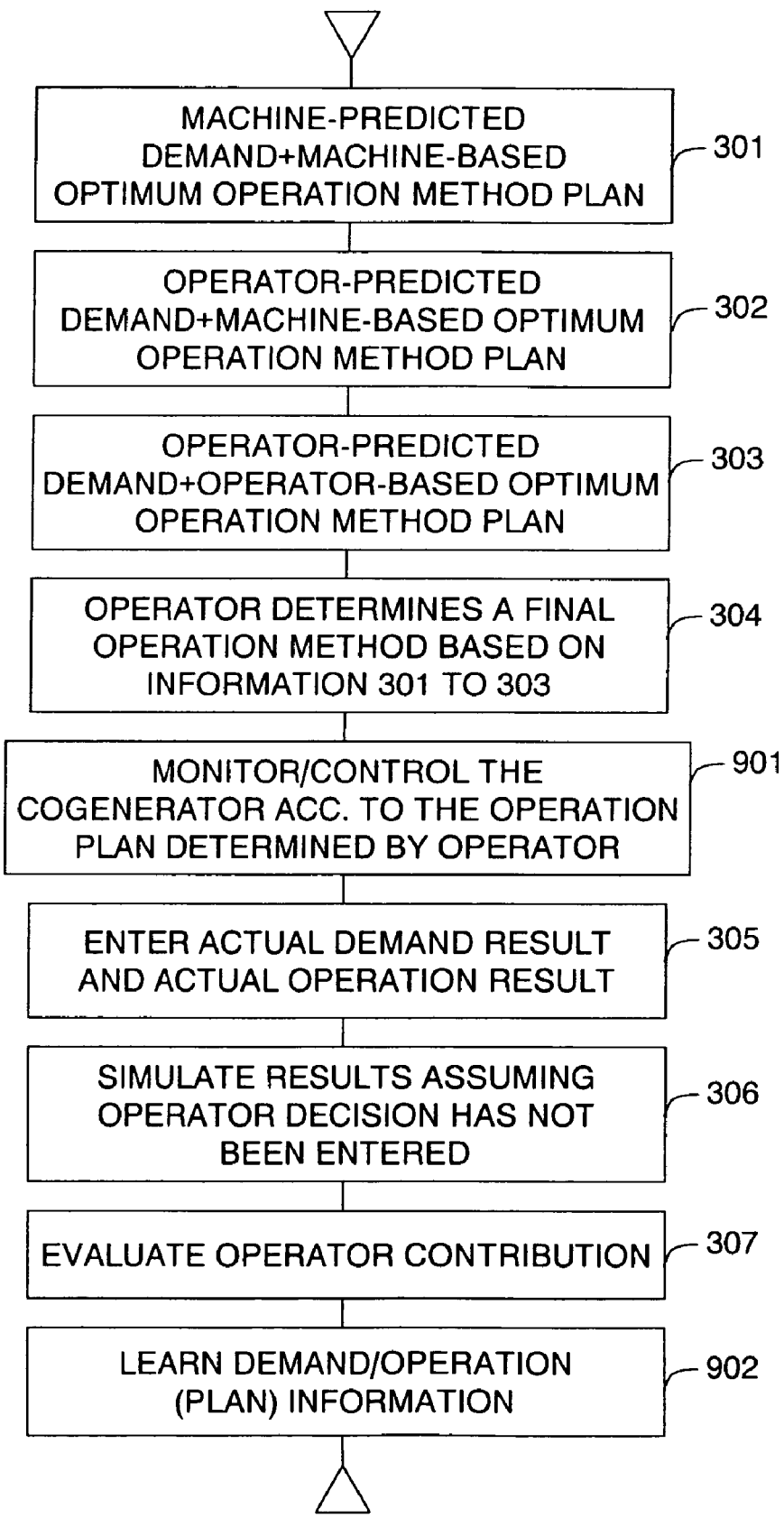
FIG. 9 shows a processing flow of an embodiment of the invention.

Referring to FIG. 9, the processing flow of the present invention will be described. Initially, a machine predicts the electric power/steam demand and, based on the predicted demand, plans an optimum cogenerator operation method (301). Then, the operator predicts the electric power/steam demand based on his or her experience, and the machine, based on the operator-predicted demand, plans an optimum cogenerator operation method (302). The operator then predicts the electric power/steam demand based on experience, and further plans an optimum cogenerator operation method (303). Based on the information obtained in 301 to 303 (machine-predicted demand+machine-based optimum operation plan, operator-predicted demand+machine-based optimum operation plan, and operator-predicted demand+operator-based optimum operation plan), the operator decides on a final operation method (304). According to the operator's decision the cogenerator 708 is monitored and controlled (901). Then, the actual demands for electric power/steam and the result of operation of the cogenerator that has been actually carried out according to the operator's decision are fed to the system (305). The system then carries out simulations to determine if any excess or loss would have resulted against the actual electric power/steam demands, or if the operation cost or carbon dioxide emissions would have been inappropriate, had it not been for the operator's decision (306). The system evaluates the operator's contribution based on the results of these simulations and displays (outputs) the evaluations for the operator (307). The system is further capable of learning information about the electric power/steam demands or the operation (plan), so that the accuracy of demand prediction or operation plan can be increased (902).

Preferably, the operator may make the decision about the final cogenerator operation method more than once in 304 (the same is true for 301 to 303). By thus allowing the cogenerator operation plan to be modified or changed in light of the actual steam or electric power demands, the system can flexibly adapt to demand fluctuations. Based on the results of such modifications or changes, monitoring and control is effected in 901. Monitoring and control in 901 can be effected remotely. Namely, information about the cogenerator 708 can be remotely monitored or controlled using the network information communication unit 702, network information communication device 801, cogenerator control unit 703, cogenerator control device 802, cogenerator monitoring unit 704, and cogenerator monitoring device 803. Thus, by allowing the cogenerator to be monitored or controlled remotely, an experienced operator can provide operation instructions for cogenerators at a plurality of factories or buildings.

The learning of the demand/operation (plan) information in 902 involves the date such as year, month and day, weather, temperature, events, number of people involved, and information about employee attendance or holidays, in association with information about the day's electric power/steam demands or operation (plan). By thus learning about the electric power/steam demands or operation (plan), the system (and finally, the operator) grows to be able to predict appropriate demands when, for example, there are periodical fluctuations in demand. Accordingly, the system is capable of dealing with fluctuations in accordance with the seasons or business climate. Further, by learning operation (plan), the accuracy of machine- (and finally, operator-) based operation plans can be enhanced.

Figure 10:
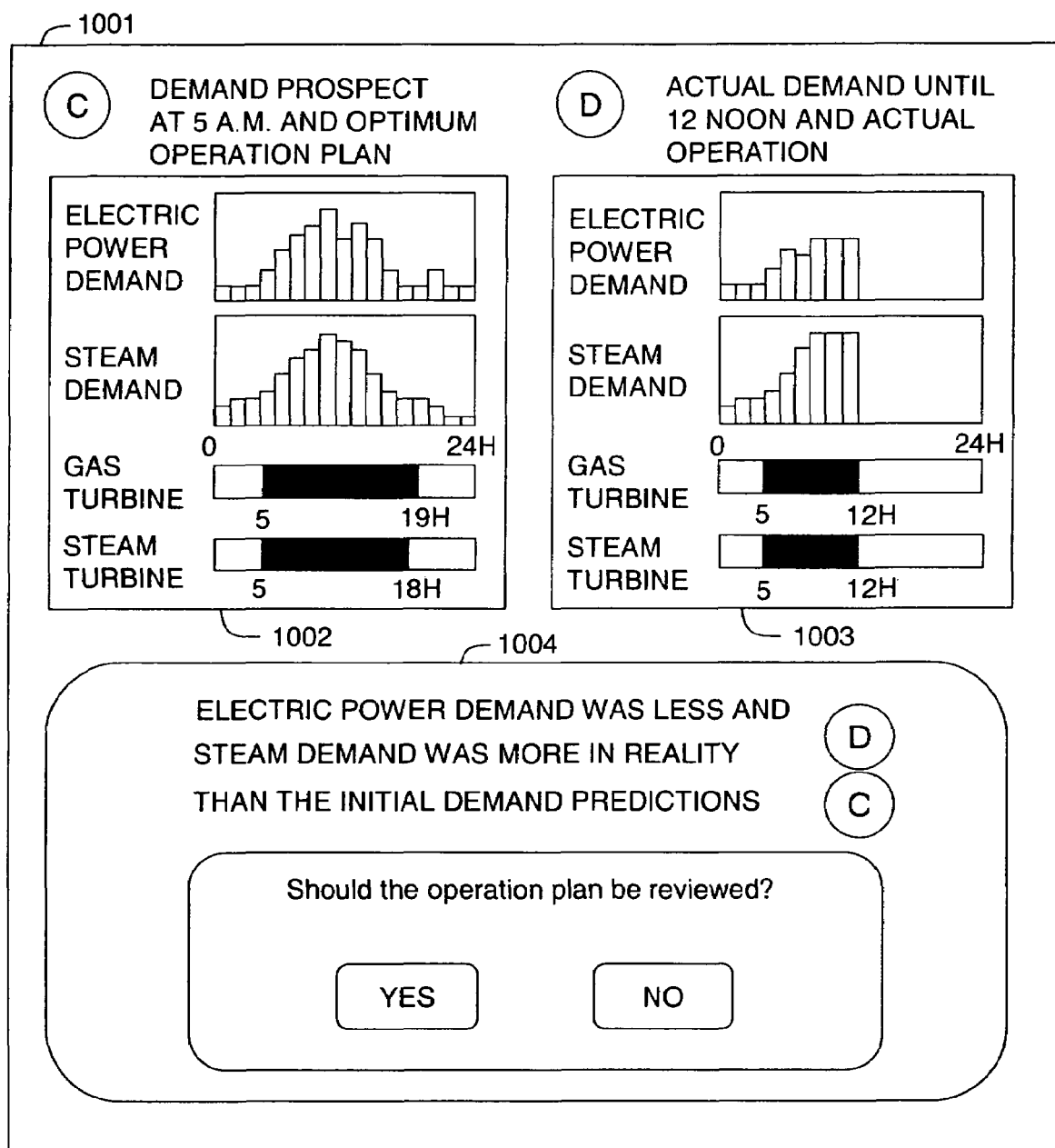
FIG. 10 shows an example of a screen for changing the method of operation by the operator in an embodiment of the invention.

The operator can monitor the cogenerator and modify (control) the cogenerator operation plan as required in 901 in light of the demand situations. In this connection, FIG. 10 shows an example of an output screen 1001 prompting the operator to modify the operation plan. In the illustrated example, there was a discrepancy between (C) the electric power/steam demand prospect in the morning (at five) 1002 and (D) the actual demand (by 12). Accordingly, the system is prompting the operator to review the operation plan (1004). The operator can review the operation plan either when he or she becomes aware of the situation, or in response to the system's recommendation. Preferably, if the operator has reviewed the operation plan appropriately in response to the system's recommendation, the operator's decision about such a review may be evaluated in 307 as part of his or her contribution. By so doing, the operator can be encouraged to positively utilize the operation-assisting system, participate in energy-saving efforts, and accomplish better operation.

Hereafter, an example of the learning of demand/operation (plan) information in 902 will be described.

Figure 11:
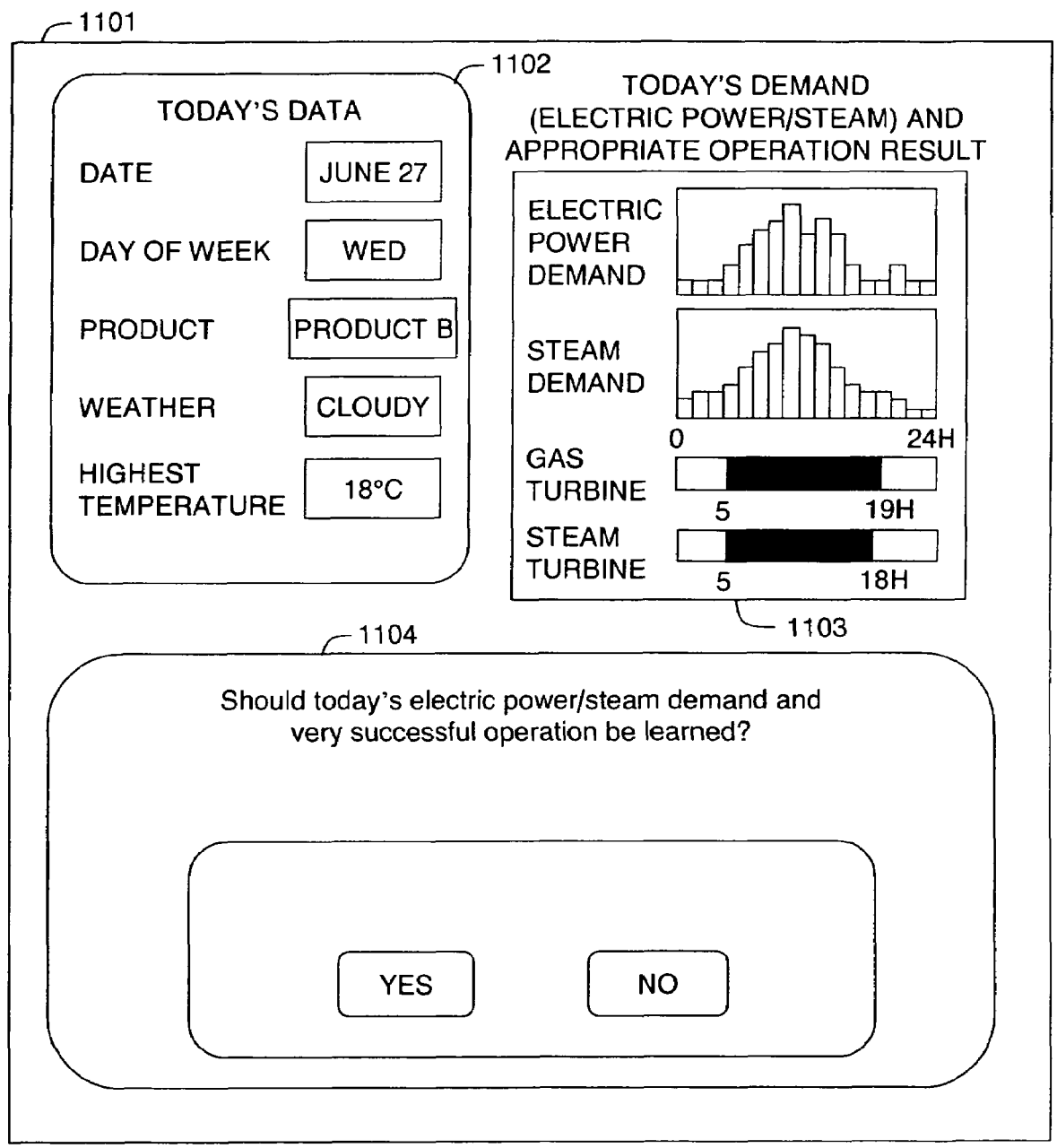
FIG. 11 shows an example of a learning screen in an embodiment of the invention.

FIG. 11 shows an example of a screen 1101 on which the operator can confirm the learning of demand/operation (plan) information in 902. The screen 1101 displays today's data 1102 including month/day, day of the week, product manufactured, weather, and (highest) temperature. The screen 1101 also displays the demand (electric and steam) and corresponding appropriate operation results 1103. There also displayed a confirmation message 1104 that says "Should today's electric power/steam demand and wonderful operation be learned?" If the day's data should not be learned, such as when the day's temperature was unusual or if an unusual product was manufactured on the day, the learning can be cancelled. Preferably, the machine can search past data and retrieve data relevant to similar conditions (such as regarding the same date, day of the week, type of the manufactured product, weather, or the number of people involved), so that if the data about to be learned is far different from past data pertaining to similar conditions, a warning can be issued suggesting the data not be learned (or asking if it should really be learned). In this way, the operator can easily find and confirm data that should not be learned. The learning of data may also be cancelled when the operation result was inappropriate. Alternatively, an optimum operation method that has been determined later with respect to demand data may be learned. By thus learning, the system can make more appropriate demand predictions and operation plans for the next time of operation and thereafter.

Figure 12:
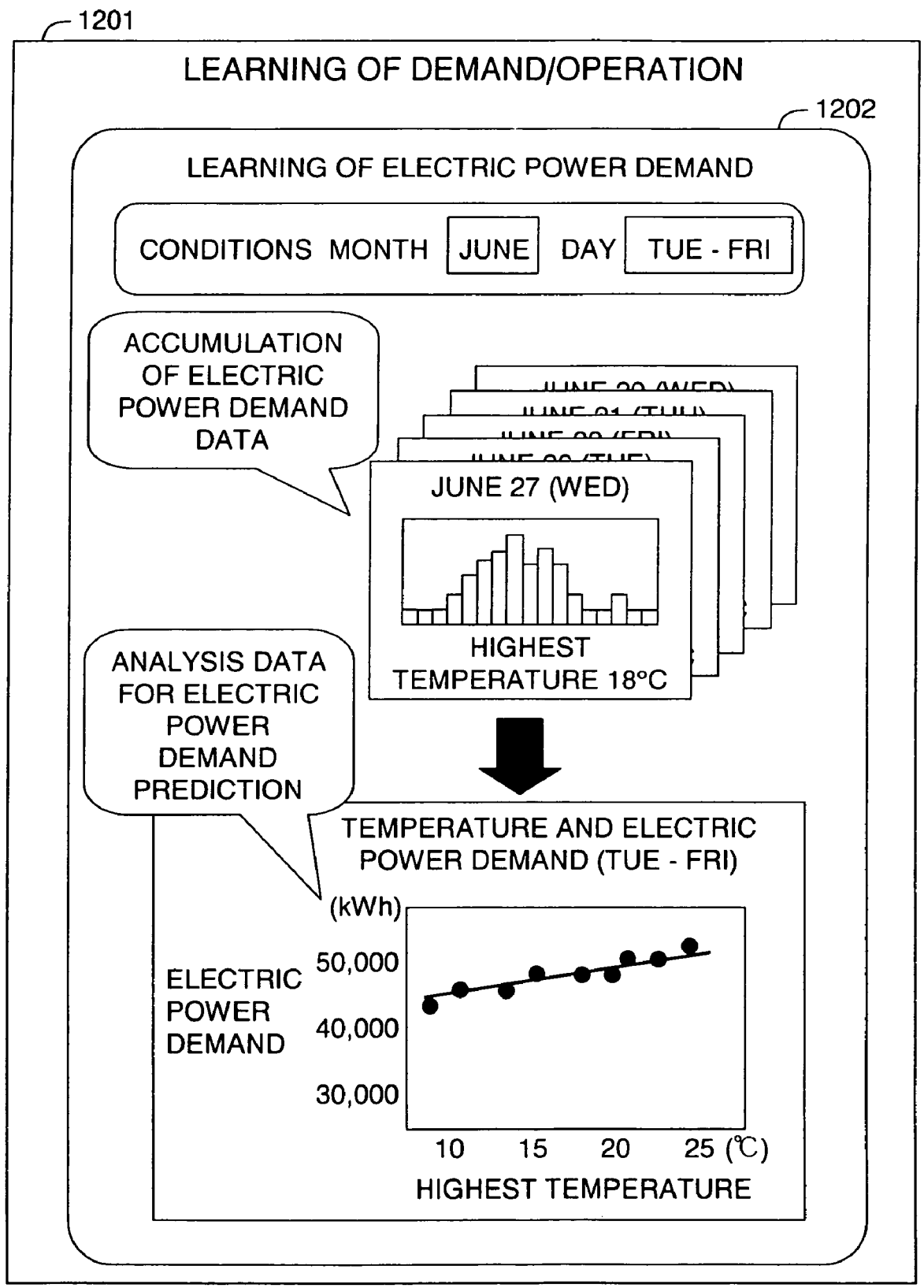
FIG. 12 shows an example of learning in an embodiment of the invention.

FIG. 12 shows an example of the learning of demand/operation. In this example, relationships between various conditions pertaining to month, day of the week (such as weekday (Monday), weekday (Tuesday through Friday), Saturday, or Sunday), temperature, and electric power demand data. In the illustrated example, if the conditions include the month of June, weekday (Tuesday through Friday), and 11 o'clock, there is a correlation between the electric power demand at that time and the day's highest temperature. If the highest temperature is known (or can be predicted), the electric power demand can be calculated from the expressions (parameters) of relations of the electric power demand. The expressions (parameters) of relations between the highest temperature and the electric power demand are determined on the basis of the daily accumulation of data such as shown in FIG. 11 as well as the electric power demand data that has been accumulated in the past.

Figure 13A:
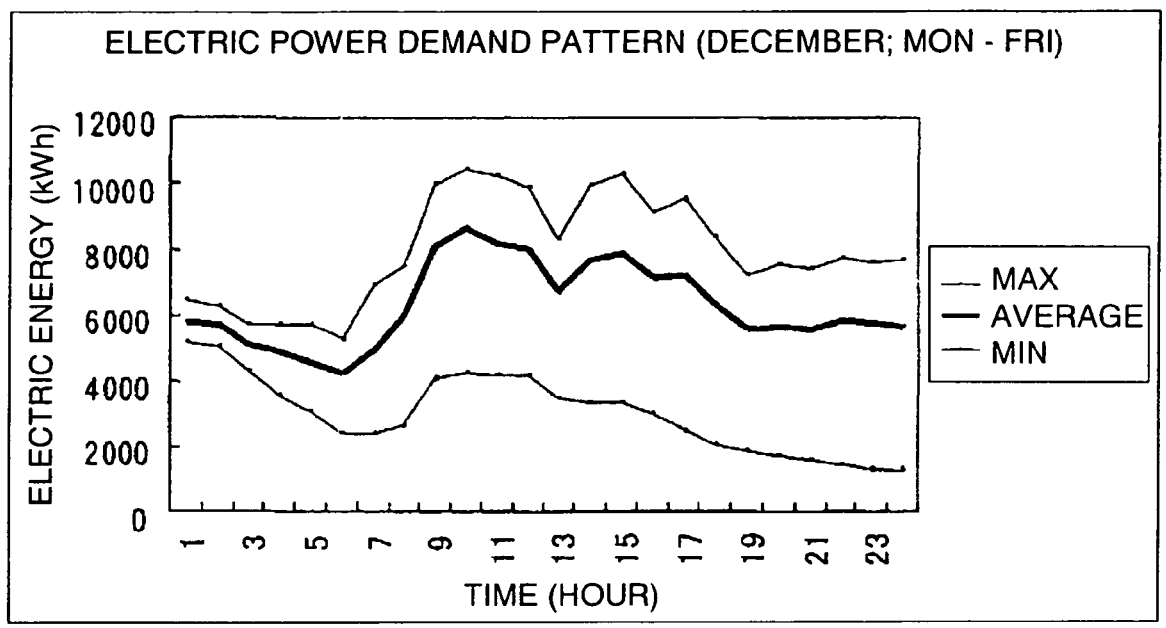
FIGS. 13a and 13b show an example of learning in an embodiment of the invention.
Figure 13B:
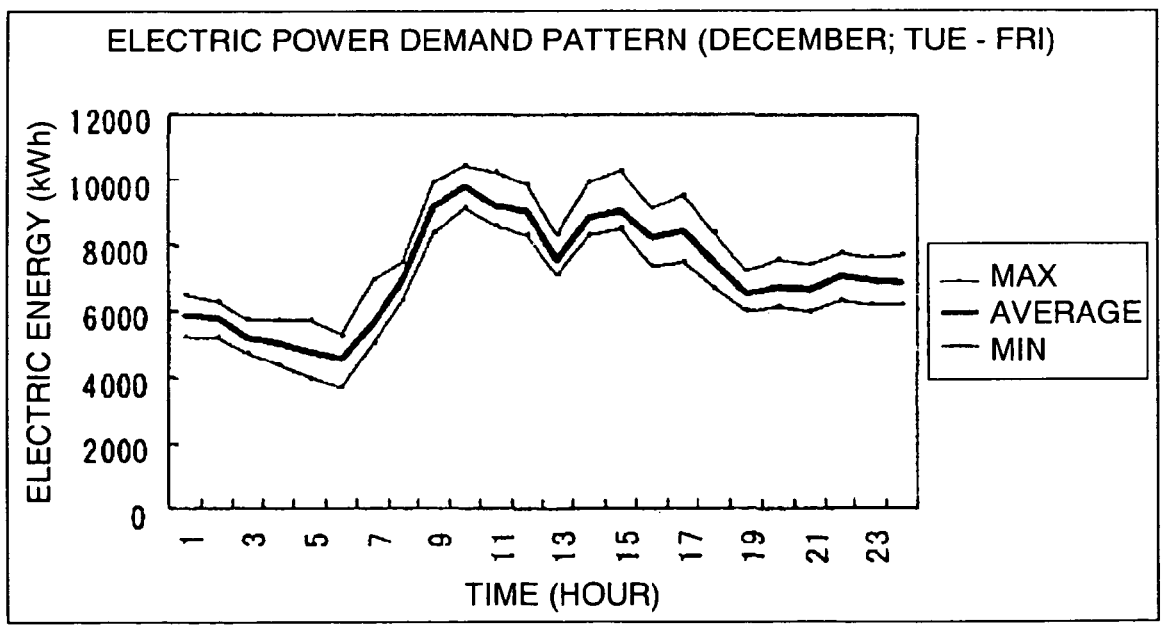

Preferably, if Saturday and Sunday are holidays (such as at factories or schools), the electric power/steam demand prediction and the data learning for demand prediction may be carried out on the basis of the days of the week grouped into Monday, Tuesday through Friday, Saturday, and Sunday. This way, more accurate predictions can be made and less memory or data space is required than when the prediction is made on the basis of each day of the week. FIG. 13 shows graphs indicating the electric power demand at each hour of weekdays in a certain month at a certain factory. When the weekdays are grouped into Monday through Friday, as shown in FIG. 13(a), the margin at each hour (the difference between each of max and min and the average) becomes large. By grouping Tuesday through Friday together, as shown in FIG. 13(b), the margin at each hour (the difference between each of max and min and the average) becomes very small. This way, the demand at each hour can be very accurately predicted.

In the present invention, the days of the week are grouped into a weekday (Monday), weekdays (Tuesday through Friday), Saturday, and Sunday. This is because the electric power/steam demands differ among the first day of the week, the following weekdays, the first holiday, and the last holiday. The days of the week, however, may preferably be grouped depending on the type of business. For example, if the number of users is larger on holidays, such as at hotels, or the number of customers is concentrated on a specific bargain day at a department store, the days of the week should be grouped accordingly. Further preferably, the parameters used for learning may be varied according to the type of business, so that an accurate demand prediction and operation plan can be made.

While the invention has been described by way of embodiments relating to cogenerator operation assistance, the invention can be similarly applied to other systems such as an energy management system for assisting building management for energy-saving purposes, or systems in which a final plan is determined based on computer-based results and human (operator) senses, thereby assisting operators.

While the above-described embodiments relate to operation assisting systems, a computer program for implementing the above-described processes may be installed on a computer.

Thus, in accordance with the invention, the operator can combine his or her operation know-how and machine-based cost-minimizing operation plan to achieve cost-saving operation while flexibly coping with demand fluctuations. Further, by evaluating the operator's contribution to energy-saving efforts, his or her willingness to do more to save energy can be enhanced.

What is claimed is:

1. An operation assisting system comprising:

means for storing an operation plan for operated equipment, which plan is prepared on the basis of a predicted state of an operation target facility prior to actual operation;

means for storing information about an actual state of said operation target facility, wherein said means for storing the actual state of said operation target facility comprises means for storing an actual demand value concerning said operation target facility;

means for storing information about the operation of operated equipment actually conducted by an operator in accordance with the actual state of said operation target facility;

means for evaluating the result of operation which, based on a comparison of the predicted state of said operation target facility and the actual state of said operation target facility stored by said means for storing the actual state of said operation target facility, evaluates information about the operation of said operated equipment actually conducted by the operator against the operation plan stored in said means for storing the operation plan;

demand prediction creating means for predicting by calculation an actual value of demand concerning said operation target facility, based on the demand value stored in said demand storing means;

simulating means for deriving by calculation information about the state of said operation target facility on the assumption that said operation target facility has been operated according to the operation plan entered into said operation plan storing means; and simulation result display means for displaying information about the state of said operation target facility derived by said simulating means, and wherein said operation plan storing means stores said operation plan for said operated equipment based on the demand predicted value regarding said operation target facility calculated by said demand prediction creating means, and wherein said operation evaluation means is arranged to evaluate the information about the operation of said operated equipment that has been actually conducted, by comparing the information about the state of said operation target facility derived by said simulating means with the operation information stored by said operation information storing means.

* * * * *